United States Patent
Ma et al.

(10) Patent No.: US 12,034,153 B2
(45) Date of Patent: Jul. 9, 2024

(54) SECONDARY BATTERY, PROCESS FOR PREPARING THE SAME AND APPARATUS CONTAINING THE SECONDARY BATTERY

(71) Applicant: Contemporary Amperex Technology Co., Limited, Ningde (CN)

(72) Inventors: Jianjun Ma, Ningde (CN); Rui Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 12 days.

(21) Appl. No.: 17/547,271

(22) Filed: Dec. 10, 2021

(65) Prior Publication Data

US 2022/0102710 A1 Mar. 31, 2022

Related U.S. Application Data

(63) Continuation of application No. PCT/CN2020/088299, filed on Apr. 30, 2020.

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0404* (2013.01); *H01M 4/505* (2013.01);
(Continued)

(58) Field of Classification Search
CPC ..... H01M 4/133; H01M 4/1393; H01M 4/366
See application file for complete search history.

(56) References Cited

U.S. PATENT DOCUMENTS

2002/0045100 A1 4/2002 Honbo et al.
2011/0200888 A1* 8/2011 Ozaki ............... H01M 10/0569
429/338
(Continued)

FOREIGN PATENT DOCUMENTS

CN 102224623 A 10/2011
CN 102326283 A 1/2012
(Continued)

OTHER PUBLICATIONS

The International search report for PCT Application No. PCT/CN2020/088299, dated Feb. 1, 2021, 11 pages.
(Continued)

*Primary Examiner* — Nathanael T Zemui
(74) *Attorney, Agent, or Firm* — Kilpatrick Townsend & Stockton LLP (57) ABSTRACT

The present application relates to a secondary battery, a process for preparing the same and an apparatus containing the secondary battery. The negative electrode film of the secondary battery comprises a first negative electrode film and a second negative electrode film; the first negative electrode film is disposed on at least one surface of the negative electrode current collector and comprises a first negative electrode active material; and the second negative electrode film is disposed on the first negative electrode film and comprises a second negative electrode active material, the first negative electrode active material comprises natural graphite and the first negative electrode active material satisfies: $0.60 \leq S1 \leq 0.85$; and the second negative electrode active material comprises artificial graphite. The secondary battery according to the present application has both better low-temperature rate performance and longer high-temperature cycle life while having a higher energy density.

17 Claims, 3 Drawing Sheets

(51) Int. Cl.
  *H01M 4/04* (2006.01)
  *H01M 4/505* (2010.01)
  *H01M 4/525* (2010.01)
  *H01M 4/587* (2010.01)
  *H01M 10/0525* (2010.01)

(52) U.S. Cl.
  CPC ........... *H01M 4/525* (2013.01); *H01M 4/587* (2013.01); *H01M 10/0525* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2011/0262802 A1* | 10/2011 | Uono | C01B 32/21 |
| | | | 429/188 |
| 2014/0065479 A1 | 3/2014 | Yamada et al. | |
| 2016/0294008 A1* | 10/2016 | Yoshida | H01M 10/0567 |
| 2017/0062822 A1 | 3/2017 | Hwang | |
| 2018/0062158 A1 | 3/2018 | Kim et al. | |
| 2018/0287145 A1* | 10/2018 | Lee | H01M 4/625 |
| 2019/0036113 A1* | 1/2019 | Ishikawa | H01M 4/5825 |
| 2019/0074539 A1* | 3/2019 | Shen | H01M 4/626 |
| 2019/0305308 A1 | 10/2019 | Lee et al. | |
| 2020/0335795 A1* | 10/2020 | Cha | H01M 4/133 |
| 2022/0131147 A1* | 4/2022 | Tsuchiya | C01B 32/205 |
| 2022/0223843 A1* | 7/2022 | Baek | H01M 4/133 |
| 2022/0255059 A1* | 8/2022 | Sung | H01M 4/525 |

FOREIGN PATENT DOCUMENTS

| | | |
|---|---|---|
| CN | 103518279 A | 1/2014 |
| CN | 103733391 A | 4/2014 |
| CN | 107785535 A | 3/2018 |
| CN | 108140810 A | 6/2018 |
| CN | 108701816 A | 10/2018 |
| CN | 109461964 A | 3/2019 |
| CN | 109704323 A | 5/2019 |
| JP | 2011034909 A | 2/2011 |
| JP | 2012033376 A | 2/2012 |
| JP | 2014086221 A | 5/2014 |
| JP | 2019508839 A | 3/2019 |
| KR | 20190090497 A | 8/2019 |
| WO | 2013018182 A1 | 2/2013 |

OTHER PUBLICATIONS

The extended European search report for European Application No. 20932863.2, dated Jul. 11, 2022, 7 pages.
The First Office Action for Chinese Application No. 2020 80006127.8, dated Oct. 9, 2022, 8 pages.
The First Office Action for India Application No. 202217030434, dated Dec. 20, 2022, 5 pages.
The Second Office Action for Chinese Application No. 202080006127.8, dated Mar. 31, 2023, 8 pages.
The First Office Action for Japanese Application No. 2022-532138, dated Jul. 10, 2023, 5 pages.
The third office action received in the corresponding Chinese application 202080006127.8, mailed Sep. 1, 2023.

* cited by examiner

SECONDARY BATTERY, PROCESS FOR PREPARING THE SAME AND APPARATUS CONTAINING THE SECONDARY BATTERY

CROSS-REFERENCE TO RELATED APPLICATIONS

This application is a continuation of International Application No. PCT/CN2020/088299, filed on Apr. 30, 2020, which is hereby incorporated by reference in its entirety.

TECHNICAL FIELD

The present application belongs to the field of electrochemical technology and, more specifically, relates to a secondary battery, a process for preparing the same and an apparatuses containing the secondary battery.

BACKGROUND

Secondary battery is widely used in various consumer electronic products and electric vehicles due to its outstanding characteristics of light weight, no pollution, and no memory effect.

With the development of new energy industry, people put forward higher energy density for secondary batteries. However, the performance of secondary batteries puts forward higher requirements for use. Therefore, how to improve other electrochemical properties of secondary batteries on the premise of high energy density is the key challenge in the field of battery design.

In view of this, it is necessary to provide a secondary battery which can solve the above problems.

SUMMARY

In view of the technical problems in the background, the present application provides a secondary battery, a process for preparing the same and an apparatus including the secondary battery, which aims at achieving both better low temperature rate performance and longer high temperature cycle life while the secondary battery has a high energy density.

In order to achieve the above object, a first aspect of the present application provides a secondary battery, comprising a negative electrode plate, wherein the negative electrode plate comprises a negative electrode current collector and a negative electrode film, and the negative electrode film comprises a first negative electrode film and a second negative electrode film; the first negative electrode film is disposed on at least one surface of the negative electrode current collector and comprises a first negative electrode active material, and the second negative electrode film is disposed on the first negative electrode film and comprises a second negative electrode active material, the first negative electrode active material comprises natural graphite, and the first negative electrode active material satisfies: $0.60 \leq S1 \leq 0.85$, where $S1=W_{2H}/(W_{3R}+W_{2H})$; and the second negative electrode active material comprises artificial graphite; in which $W_{3R}$ is a peak area of 101 crystal plane in a X-ray diffraction spectrum of the first negative electrode active material at a diffraction angle of $43.3 \pm 0.05°$, and $W_{2H}$ is a peak area of 101 crystal plane in a X-ray diffraction spectrum of the first negative electrode active material at a diffraction angle of $44.5 \pm 0.05°$.

A second aspect of the present application provides a process for preparing a secondary battery, comprising preparing a negative electrode plate of the secondary battery by the following steps:

1) forming a first negative electrode film comprising a first negative electrode active material on at least one surface of a negative electrode current collector, wherein the first negative electrode active material comprises natural graphite and the first negative electrode active material satisfies: $0.60 \leq S1 \leq 0.85$, where $S1=W_{2H}/(W_{3R}+W_{2H})$; and 2) forming a second negative electrode film comprising a second negative electrode active material on the first negative electrode film, wherein the second negative electrode active material comprises artificial graphite;

in which $W_{3R}$ is a peak area of 101 crystal plane in a X-ray diffraction spectrum of the first negative electrode active material at a diffraction angle of $43.3 \pm 0.05°$, and $W_{2H}$ is a peak area of 101 crystal plane in a X-ray diffraction spectrum of the first negative electrode active material at a diffraction angle of $44.5 \pm 0.05°$.

A third aspect of the present application provides an apparatus comprising a secondary battery according to the first aspect of the present application or a secondary battery prepared according to the process of the second aspect of the present application.

Over existing technologies, the present application provides at least the following beneficial effects:

In the secondary battery according to the application, the negative electrode plate comprises a first negative electrode film and a second negative electrode film and in the first negative electrode film, a first negative electrode active material with a particular composition is set, so that the secondary battery can have better low temperature rate performance and longer high temperature cycle life on the premise of higher energy density.

The reference signs used in the appended drawings are as follows:
1 Battery pack
2 Upper cabinet body
3 Lower cabinet body
4 Battery module
5 Secondary battery
51 House
52 Electrode assembly
53 Cover plate
10 Negative electrode plate

101 Negative electrode current collector
102 Second negative electrode film
103 First negative electrode film

DETAILED DESCRIPTION

The application is further described in combination with specific embodiment as follows. It should be understood that these specific embodiments are used only to describe the application without limitation to its scope.

For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. The recitation of "more" in the phrase "one or more" includes two or more.

Unless otherwise stated, the terms used in the present application have the common meaning known by technicians in this field. Unless otherwise stated, the values of the parameters mentioned in the present application may be measured by various methods commonly used in this field, for example by the methods below given in the examples of the present application.

Secondary Battery

The first aspect of the application provides a secondary battery. The secondary battery comprises a positive electrode plate, a negative electrode plate and an electrolyte. During battery charging and discharging, active ions are intercalated and de-intercalated between positive and negative electrode plates. Electrolytes act as conducting ions between positive and negative electrode plates.

[Negative Electrode Plate]

The negative electrode plate according to the present application comprises a negative current collector and a negative electrode film, wherein the negative electrode film comprises a first negative electrode film and a second negative electrode film; the first negative electrode film is disposed on at least one surface of the negative current collector and comprises a first negative electrode active material, the second negative electrode film is disposed on the first negative electrode film and comprises a second negative electrode active material, the first negative electrode active material comprises natural graphite, and the first negative electrode active material satisfies: $0.60 \leq S1 \leq 0.85$, where $S1=W_{2H}/(W_{3R}+W_{2H})$; and the second negative electrode active material comprises artificial graphite; in which $W_{3R}$ is a peak area of 101 crystal plane in a X-ray diffraction spectrum of the first negative electrode active material at a diffraction angle of 43.3±0.05°, and $W_{2H}$ is a peak area of 101 crystal plane in a X-ray diffraction spectrum of the first negative electrode active material at a diffraction angle of 44.5±0.05°.

Since the present application uses a negative electrode film having a specific double-layer structure, and the upper and lower layers use specific negative electrode active materials, the battery can have better low-temperature rate performance under the premise of higher energy density. After research the inventors found that when the first negative electrode active material of the present application comprises natural graphite, the second negative electrode active material comprises artificial graphite, and S1 of the first negative electrode active material is controlled within the given range, active sites of upper and lower layers in the negative electrode plate are reasonably matched, which is conducive to improving rate performance of the battery. At the same time, porosities of the upper and lower layers are also reasonably optimized, which is conducive to electrolyte infiltration and improving cycle life of the battery.

When S1 is less than 0.6, there are too many defects in the active material, and the surface activity is high, which deteriorates high temperature cycle performance of the battery. At the same time, accumulation of side reaction products caused by too many defects on the negative electrode plate will easily cause expansion of the battery core, which will cause the electrolyte to squeeze out and affect cycle life of the battery. When S1 is greater than 0.85, the surface activity of the active material is low, which deteriorates low-temperature rate performance of the battery.

In a preferred embodiment, the first negative electrode active material satisfies $0.70 \leq S1 \leq 0.80$.

The inventors have conducted intensive studies to find that, on the basis that the negative electrode plate according to the present application satisfies the foregoing requirements, the performance of the battery can be further improved in the event that it optionally satisfies one or more of the following requirements.

In a preferred embodiment of the present application, the first negative electrode active material has a graphitization degree of from 95% to 98%, preferably from 96% to 97%.

In a preferred embodiment of the present application, the second negative electrode active material has a graphitization degree of from 90% to 95%, preferably from 91% to 93%.

In a preferred embodiment of the present application, the first negative electrode active material has a powder compaction density of from 1.85 g/cm$^3$ to 2.1 g/cm$^3$, preferably from 1.9 g/cm$^3$ to 2.0 g/cm$^3$ under a pressure of 50,000 N.

In a preferred embodiment of the present application, the second negative electrode active material has a powder compaction density of from 1.7 g/cm$^3$ to 1.9 g/cm$^3$, preferably from 1.8 g/cm$^3$ to 1.9 g/cm$^3$ under a pressure of 50,000 N.

In a preferred embodiment of the present application, the first negative electrode active material has a specific surface area (SSA) of from 1.6 m$^2$/g to 2.4 m$^2$/g, preferably from 1.8 m$^2$/g to 2.2 m$^2$/g.

In a preferred embodiment of the present application, the second negative electrode active material has a specific surface area (SSA) of from 0.7 m$^2$/g to 1.5 m$^2$/g, preferably from 0.9 m$^2$/g to 1.3 m$^2$/g.

In a preferred embodiment of the present application, the volume average particle size DV50 of the first negative electrode active material is greater than the volume average particle size DV50 of the second negative electrode active material.

In a preferred embodiment of the present application, the volume average particle size DV50 of the first negative electrode active material is from 15 μm to 19 μm, preferably from 16 μm to 18 μm.

In a preferred embodiment of the present application, the volume average particle size DV50 of the second negative electrode active material is from 14 μm to 18 μm, preferably from 15 μm to 17 μm.

The inventors through research found that when the volume average particle size DV50 of the first negative electrode active material and/or the second negative electrode active material is within the given range, it is conducive to further improving the dynamic performance of the battery. At the same time, when the particle size is within the given range, the capacity difference of the upper and lower active materials can be reduced, and the risk of lithium precipitation during the battery cycle can be reduced, thereby further improving cycle performance of the battery.

In a preferred embodiment of the present application, the natural graphite has a morphology that is one or more of spherical and quasi-spherical.

In a preferred embodiment of the present application, the artificial graphite has a morphology that is one or more of a block shape and a sheet shape.

In a preferred embodiment of the present application, the natural graphite is present in the first negative electrode active material in a mass percentage of ≥50%, more preferably from 80% to 100%.

In a preferred embodiment of the present application, the artificial graphite is present in the second negative electrode active material in a mass ratio of is ≥80%, more preferably 90%-100%.

In this application, the meanings represented by $W_{2H}$ and $W_{3R}$ are well known in the art and can be tested by methods known in the art. For example, it can be tested with an X-ray diffractometer (such as Bruker D8 Discover). Then, the value of S1 can be obtained by calculation with the formula of the present application.

In the present application, the graphitization degree of material has a common meaning in this field and can be tested using methods already known in this field. For example the test could be performed using an X-ray diffractometer (e.g. Bruker D8 Discover). According to JIS K 0131-1996 and JB/T 4220-2011, the size of d002 can be measured, and then the graphitization degree can be calculated according to the formula $G=(0.344-d002)/(0.344-0.3354) \times 100\%$, where d002 is the interlayer spacing of graphite crystal structure in nm.

In the present application, $D_V50$ of the material has a meaning known in the art and can be tested using methods known in the art. It can be measured, for example, by a laser diffraction particle size distribution tester (e.g., a Malvern Mastersizer 3000) with reference to particle size laser diffraction e.g. the standard GB/T19077-2016. $D_V50$ refers to the corresponding particle size when the cumulative volume percentage of the material reaches 50%.

In the present application, the power compacted density of a material has a common meaning in the art and can be tested by the method known in this field. For example, the test could be implemented with reference to GB/T 24533-2009 using an electronic pressure testing machine (such as UTM7305) as follows: putting a certain amount of powder on a special mold for compaction, setting different pressure, reading the thickness of the powder on the apparatus under different pressure, and calculating the compacted density under different pressure. In the present application, the pressure is set to be 50,000N.

In the present application, the specific surface area (SSA) of a material has a common meaning in the art and can be tested by the method known in this field. For example, it may be tested with a nitrogen adsorption specific surface area analysis test method and calculated by a BET (Brunauer Emmett Teller) method, wherein the nitrogen adsorption specific surface area analysis test can be implemented using NOVA 2000e specific surface area and pore size analyzer of Conta Company, USA.

In this application, the morphology of a negative electrode active material has a well-known meaning in the art, and can be tested by methods known in the art. For example, the electrode active material is stuck on a conductive adhesive, and tested with a scanning electron microscope (such as sigma300) for morphology of particles. The test can be carried out with reference to JY/T010-1996.

It should be noted that the above-mentioned various parameter tests for the negative electrode active material can be performed by sampling and testing before coating, or can be performed by sampling and testing from the negative electrode film after cold pressing.

When the above test samples are taken from the negative electrode film after cold pressing, as an example, they can be sampled as follows:

(1) Firstly, a cold-pressed negative electrode film is randomly selected, and samples of the second negative electrode active material are taken by scraping powders (a blade can be used for sampling), wherein the depth of the powder scraping should not be more than the boundary between the first negative electrode film and the second negative electrode film;

(2) Secondly, samples of the first negative electrode active material are taken. Since there may be an inter-fusion layer between the first negative electrode film and the second negative electrode film during the cold pressing process (that is, the first active material and the second active material are both present in the inter-fusion layer), the inter-fusion layer can be scraped off first before sampling the first negative electrode active material, and then the first negative electrode active material is scraped to get the samples for the accuracy of the measurement; and (3) The samples of the first negative electrode active material and the second negative electrode active material as collected above are placed into deionized water respectively, subjected to suction filtration followed by drying, and then the dried negative electrode active materials are sintered at a certain temperature and time (for example, at 400° C. for 2 h) to remove the binder and conductive carbon, giving the test samples of the first negative electrode active material and the second negative electrode active material.

In the above sampling process, the boundary between the first negative electrode film and the second negative electrode film can be determined with the aid of an optical microscope or a scanning electron microscope.

Both natural graphite and artificial graphite used in this application can be obtained commercially.

In a preferred embodiment of the present application, the negative electrode film has a thickness of preferably ≥60 m, more preferably from 65 μm to 80 m. It should be noted that the thickness of the negative electrode film refers to the total thickness of the negative electrode film (that is, the sum of the thicknesses of the first negative electrode film and the second negative electrode film).

In a preferred embodiment of the present application, the negative electrode film has an areal density of 10 mg/cm² ≤CW≤13 mg/cm², preferably, 10.5 mg/cm² ≤CW≤11.5 mg/cm². It should be noted that the areal density of the negative electrode film refers to the areal density of the whole negative electrode film (that is, the sum of the areal density of the first negative electrode film and the second negative electrode film).

In a preferred embodiment of the present application, the thickness ratio of the first negative electrode film to the second negative electrode film is from 1:1.01 to 1:1.1, preferably from 1:1.02 to 1:1.06.

When the thickness of the upper and lower layers is with the given range, it is beneficial to the formation of a gradient pore distribution in the upper and lower layers, so that the liquid phase conduction resistance of the active ions de-intercalated from the positive electrode on the surface of the negative electrode film is reduced, and the accumulation of ions on the surface layer will not cause lithium precipitation problems. At the same time, the uniform diffusion of active ions in films is beneficial to reduce polarization and further improve the dynamic performance and cycle performance of the battery.

In the present application, the thickness of the negative electrode film can be measured with a high-qualified micrometer, for example, Mitutoyo293-100 with an accuracy of 0.1 μt.

In the present application, the respective thicknesses of the first negative electrode film and the second negative electrode film can be measured by using a scanning electron microscope (such as Zeiss sigma 300). The sample is prepared as follows: firstly, cutting the negative electrode into a certain size sample to be tested (e.g. 2 cm×2 cm), fixing the negative electrode sample on a sample station by paraffin. Then the sample station is placed onto the sample holder and well fixed. An argon cross-section polisher (such as IB-19500CP) is powered on and vacuumed (to e.g. $10^4$ Pa), various parameters such as argon flow (such as 0.15 MPa), voltage (such as 8 KV) and polishing period (such as 2 hours) are set, and the sample holder is adjusted to start polishing in a swing mode. For sample testing, reference can be made to JY/T 010-1996. To ensure the accuracy of the test results, several (for example, 10) different areas in the test sample may be randomly selected for scanning and testing, and at a certain magnification (for example, 500 times), the respective thickness of the first negative electrode film and the second negative electrode film are read in the measuring areas, and then the average value of the test results from the several test areas are taken as the average thickness of the first negative electrode film and the second negative electrode film, respectively.

In the present application, the areal density of the negative electrode film has a common meaning in this field and can be tested using methods known in this field. For example, a negative electrode plate subjected to a single-side coating and cold pressing is taken (if the negative electrode plate to be tested is subjected to a double-side coating, one side of the negative electrode film can be wiped off firstly), cut into small round disks with an area of S1, and the weight thereof is recorded as M1. Then the negative electrode film on the weighed negative electrode plate is wiped off and the negative electrode current collector is weighed again and the weight is recorded as M0. The areal density of the negative electrode film can be determined by the formula: (weight of negative electrode plate M1–weight of negative electrode current collector M0)/S1. To ensure the accuracy of the test result, multiple (such as 10) test samples may be tested, and the average value is calculated as the test result.

The compacted density of negative electrode film has a common meaning in this field and can be tested by methods already known in this field. For example, the areal density and thickness of negative electrode film could be obtained according to the above test methods, and the compacted density of negative electrode film is equal to areal density of negative electrode film/thickness of negative electrode film.

In the secondary battery according to the present application, the negative electrode current collector may be a metal foil or a composite electrode current collector in which a metal material may be arranged on a polymer substrate to form the composite electrode current collector. As an example, the negative electrode current collector can be a copper foil.

In the secondary battery of the present application, the first negative electrode film and/or the second negative electrode film generally contains a negative electrode active material, and an optional binder, an optional conductive agent, as well as other optional auxiliaries, and is generally formed by drying a negative electrode film slurry coating. The negative electrode film slurry is generally formed by dispersing the negative electrode active material and optionally a conductive agent, a binder, and the like in a solvent, such as N-methylpyrrolidone (NMP) or deionized water, with stirring uniformly. Other optional auxiliaries may be, for example, thickening and dispersing agents (e.g. sodium carboxyl methylcellulose, CMC-Na), PTC thermistor materials, and the like.

As an example, the conductive agent may include one or more of the superconducting carbon, acetylene black, carbon black, Ketjen black, carbon dots, carbon nanotubes, graphene, and carbon nanofibers.

As an example, the binder may include one or more of the styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA) and polyvinyl butyral (PVB).

In the secondary battery of the present application, the first negative electrode active material and/or the second negative electrode active material may optionally include a certain amount of other common negative electrode active materials, such as one or more of soft carbon, hard carbon, silicon-based materials, tin-based materials, and lithium titanate, in addition to the specific negative electrode active material described above. The silicon-based material can be one or more selected from the elemental silicon, silicon-oxygen compound, silicon carbon complex and silicon alloy. The tin-based material can be one or more selected from elemental tin, tin oxygen compound, and tin alloys. Methods for preparing these materials are well known and these materials are commercially available. Technicians in this field can make appropriate choices based on the actual application environment.

In the secondary battery according to the present application, the negative electrode film can be arranged on either or both of the two opposite surfaces of the negative electrode current collector.

Figure 2:
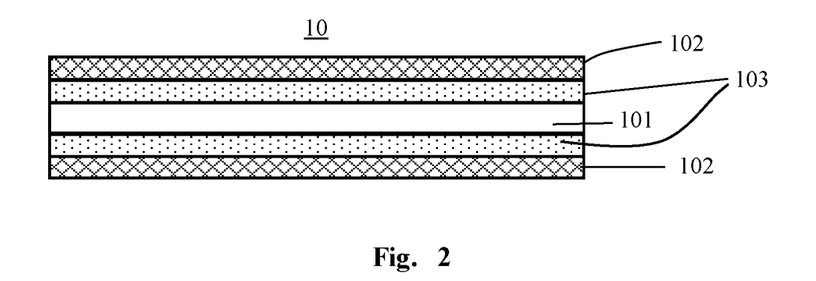
FIG. 2 shows a schematic diagram of an embodiment of a negative electrode plate of a secondary battery in the present application.

FIG. 2 shows the schematic diagram of an embodiment of the negative electrode plate 10 in the present application. The negative electrode plate 10 is composed of the negative electrode current collector 101, the first negative electrode films 103 arranged on the two surfaces of the negative electrode current collector, and the second negative electrode films 102 arranged on the first negative electrode films 103.

Figure 3:
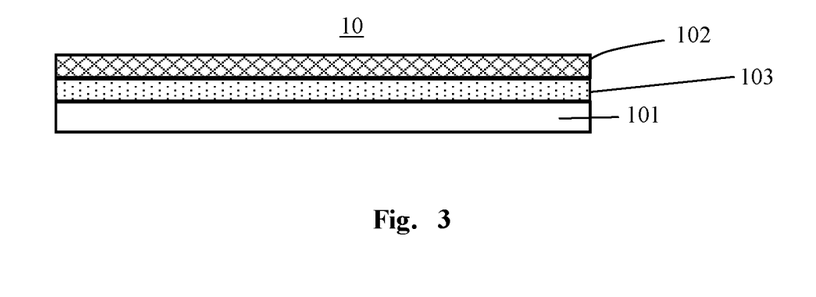
FIG. 3 shows a schematic diagram of another embodiment of a negative electrode plate of a secondary battery in the present application.

FIG. 3 shows the schematic diagram of another embodiment of the negative electrode plate 10 in the present application. The negative electrode plate 10 is composed of the negative electrode current collector 101, the first negative electrode film 103 arranged on one surface of the negative electrode current collector, and the second negative electrode film 102 arranged on the first negative electrode film 103.

It shall be noted that each negative electrode film parameter, such as thickness, areal density, compacted density of the negative electrode film and so on, given in the present application refers to a parameter range of a single-side film. If the negative electrode films are located on both surfaces of the negative electrode current collector, and the film parameter on either surface satisfies requirements of the present application, it should be deemed to fall within the protection scope of the present application. The ranges of the film thickness, areal density and the like mentioned in the present application refer to the parameters of the film after cold pressing used for assembly of a battery.

In addition, in the secondary battery according to the present application, a negative electrode plate does not exclude other additional functional layers than a negative electrode film. For example, in some embodiments, the negative electrode plate of the present application further comprises a conductive primer (e.g., consisting of a conductive agent and a binder) sandwiched between the current collector and the first film and disposed on the surface of the current collector. In some other embodiments, the negative electrode plate of the present application further includes a protective cover layer covering the surface of the second film.

[Positive Electrode Plate]

In the secondary battery of the present application, the positive electrode plate comprises a positive electrode current collector and a positive electrode film arranged on at least one surface of the positive electrode current collector and comprising a positive electrode active material.

It should be noted that the positive electrode current collector has two opposite surfaces in the direction of its thickness. The positive electrode film may be laminated on either or both of the two opposite surfaces of the positive electrode current collector.

In the secondary battery of the present application, the positive electrode current collector may be a common metal foil or a composite electrode current collector in which a metal material can be arranged on a polymer substrate to form the composite electrode current collector. As an example, the positive electrode current collector maybe an aluminum foil.

In the secondary battery of the present application, the positive electrode active material may include one or more of lithium transition metal oxides, lithium phosphates of olivine structure and their respective modified compounds. Examples of lithium transition metal oxides may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and their modified compounds. Examples of lithium phosphates in olivine structures may include, but may not be limited to, one or more of lithium iron phosphate, a composite of lithium iron phosphate with carbon, lithium manganese phosphate, a composite of lithium manganese phosphate with carbon, lithium iron manganese phosphate, a composite of lithium iron manganese phosphate with carbon and their modified compounds. The present application is not limited to these materials, but may also adopt other conventional and common materials that can be used as positive electrode active materials for secondary batteries.

In some preferred embodiments, in order to further increase the energy density of the battery, the positive electrode active material may include one or more of a lithium transition metal oxide represented by formula 1 and the modified compounds thereof, $$Li_aNi_bCo_cM_dO_eA_f$$ Formula 1, in which, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S, and Cl.

In the present application, the modified compounds of above-mentioned materials may be compounds obtained by doping and/or surface coating of materials for modification.

In the secondary battery of the present application, the positive electrode film also optionally comprises a binder and/or a conductive agent.

As an example, the binder for the positive electrode film may include one or more of polyvinylidene fluoride (PVDF) and polytetrafluoroethylene (PTFE).

As an example, the conductive agent for the positive electrode film may include one or more of superconducting carbon, acetylene black, carbon black, Ketjen black, carbon dot, carbon nanotube, graphene and carbon nanofiber.

[Electrolyte]

Electrolytes act as conducting ions between positive and negative electrode plates. The present application has no specific limitation on the type of electrolyte, which may be selected according to requirements. For example, electrolytes may be at least one selected from solid and liquid electrolytes (i.e. electrolyte solution).

In some embodiments, the electrolyte is an electrolyte solution. The electrolyte solution includes an electrolyte salt and a solvent.

In some embodiments, the electrolyte salt can be one or more selected from $LiPF_6$ (Lithium Hexafluorophosphate), $LiBF_4$ (Lithium Tetrafluoroborate), $LiClO_4$ (Lithium Perchlorate), $LiAsF_6$ (Lithium Hexafluoroarsenate), LiFSI (Lithium Bisfluorosulfonimide), LiTFSI (Lithium Bis(trifluoromethanesulfonyl)imide), LiTFS (Lithium Trifluoromethanesulfonate), LiDFOB (Lithium Difluoro(oxalate) borate), LiBOB (Lithium Bis(oxalate)borate), $LiPO_2F_2$ (Lithium Difluorophosphate), LiDFOP (Lithium Difluorodioxalate phosphate) and LiTFOP (Lithium Tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluorinated ethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulphide (EMS), and ethyl sulfonyl ethanol (ESE).

In some embodiments, additives are also optionally included in the electrolyte solution. For example, additives may include negative electrode film forming additives, or positive electrode film forming additives, as well as additives that can improve some performances of batteries, such as additives that improve battery overcharge performance, additives that improve high-temperature performance, and additives that improve low-temperature performance.

[Separator]

Secondary batteries using electrolyte solutions, as well as some secondary batteries using solid-state electrolytes, also include a separator. The separator is arranged between the positive electrode plate and the negative electrode plate for isolation. The present application has no special limitation on the type of separator. Any common porous separator with good chemical and mechanical stability can be selected. In some embodiments, the material of the separator may be one or more selected from glass fibers, non-woven fabrics, polyethylene, and polypropylene and polyvinylidene fluoride. The separator can be either a single-layer film or a multi-layer composite film. When the separator is a multi-layer composite film, the materials of each layer may be the same or different.

In some embodiments, an electrode assembly can be made by winding or laminating the positive electrode plate, negative electrode plate and separator.

In some embodiments, the secondary battery may include an external package. The external package can be used to encapsulate the electrode assembly and electrolyte.

In some embodiments, the external package of the secondary battery may be a hard shell, such as hard plastic shell, aluminum shell, and steel shell. The external package of the secondary battery can also be a soft pack, such as a bag-type soft pack. The soft pack may be made of plastics such as one or more of polypropylene (PP), polybutylene terephthalate (PBT), polybutylene succinate (PBS), and the like.

Figure 1:
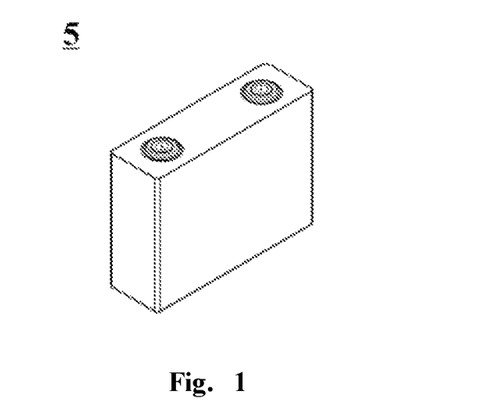
FIG. 1 shows a schematic diagram of an embodiment of a secondary battery in the present application.

The present application has no special limitation on the shape of the secondary battery, which may be cylindrical, square or any other arbitrary shape. FIG. 1 shows a secondary battery 5 with a square-shaped structure as an example.

Figure 4:
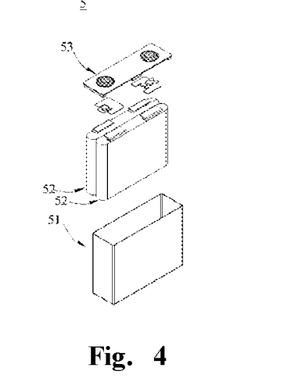
FIG. 4 shows a decomposition diagram of an embodiment of a secondary battery in the present application.

In some embodiments, the external package may include a housing 51 and a cover plate 53, as shown in FIG. 4. The housing 51 may include a bottom plate and side plates attached to the bottom plate. The bottom plate and the side plates are enclosed to form an accommodation chamber. The housing 51 has an opening communicating with the accommodation chamber, and the cover plate 53 is capable of covering the opening to close the accommodation chamber. The positive electrode plate, the negative electrode plate and the separator can form an electrode assembly 52 by winding or laminating process. The electrode assembly 52 is encapsulated in the accommodation chamber. The electrode assembly 52 is infiltrated by the electrolyte solution. The number of electrode assemblies 52 contained in the secondary battery 5 may be one or more, and may be adjusted according to requirements.

In some embodiments, the secondary batteries can be assembled into a battery module. The number of secondary batteries in the battery module can be more than one. The specific number can be adjusted according to the application and capacity of the battery module.

Figure 5:
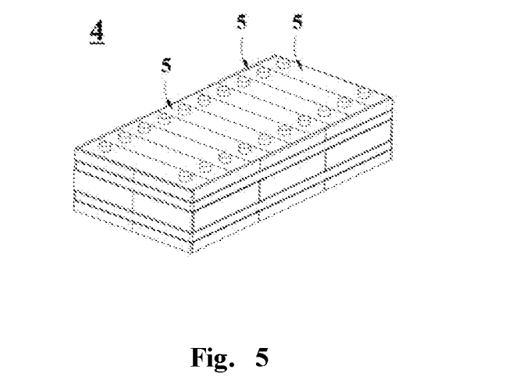
FIG. 5 shows a schematic diagram of an embodiment of a battery module.

FIG. 5 shows the battery module 4 as an example. With reference to FIG. 5, in the battery module 4, multiple secondary batteries 5 may be arranged in sequence along the length direction of battery module 4. Of course, it can also be arranged in any other ways. Further, the multiple secondary batteries 5 can be fixed by fasteners.

Optionally, the battery module 4 can also include a house with the accommodation space, in which multiple secondary batteries 5 are accommodated.

In some embodiments, the battery modules can also be assembled into a battery pack. The number of battery modules contained in the battery pack can be adjusted according to the application and capacity of the battery pack.

Figure 6:
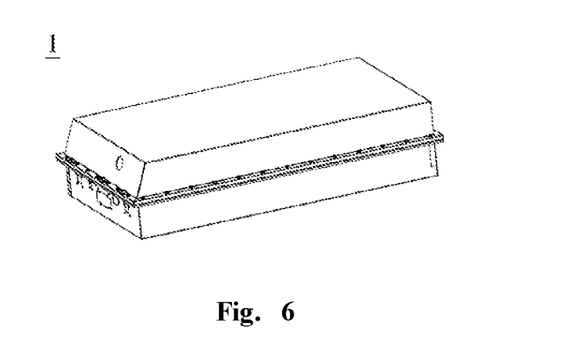
FIG. 6 shows a schematic diagram of an embodiment of a battery pack.
Figure 7:
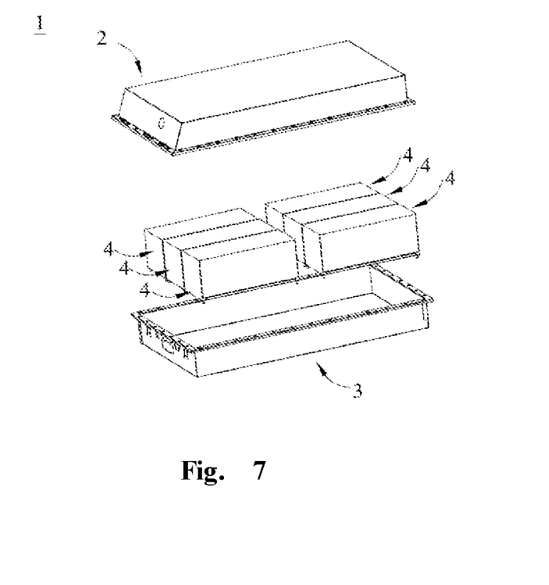
FIG. 7 is an exploded diagram of FIG. 6.

FIGS. 6 and 7 are of the battery pack 1 as an example. With reference to FIG. 6 and FIG. 7, the battery pack 1 may include a battery cabinet body and multiple battery modules 4 set in the battery cabinet body. The battery cabinet body comprises an upper cabinet body 2 and a lower cabinet body 3, wherein the upper cabinet body 2 is capable of covering the lower cabinet body 3 and form a closed space for accommodating the battery module 4. Multiple battery modules 4 can be arranged in any way in the battery cabinet body.

Process for Preparing Secondary Batteries

The second aspect of the present application provides a process for preparing a secondary battery, including preparing a negative electrode plate of the secondary battery by the following steps:

1) forming, on at least one surface of a negative electrode current collector, a first negative electrode film comprising a first negative electrode active material that comprises natural graphite and satisfies: $0.60 \leq S1 \leq 0.85$, where $S1 = W_{2H}/(W_{3R} + W_{2H})$; and 2) forming, on the first negative electrode film, a second negative electrode film comprising a second negative electrode active material that comprises artificial graphite, wherein $W_{3R}$ is a peak area of 101 crystal plane in a X-ray diffraction spectrum of the first negative electrode active material at a diffraction angle of $43.3 \pm 0.05°$, and $W_{2H}$ is a peak area of 101 crystal plane in a X-ray diffraction spectrum of the first negative electrode active material at a diffraction angle of $44.5 \pm 0.05°$.

In the process of preparing the secondary battery, by controlling and adjusting the respective composition of the first negative electrode active material and the second negative electrode active material of the negative electrode, the secondary battery of the present application can have good low temperature rate performance and long cycle life while having higher energy density.

In the process for preparing the secondary battery, the first negative electrode active material slurry and the second negative electrode active material slurry can be coated at the same time in one step, or can be coated separately.

In some preferred embodiments, the first negative electrode active material slurry and second negative electrode active material slurry are simultaneously applied at one time. The first and second negative electrode films can be better bonded by applying together in one coating step, which may further improve the cycle performance of the battery.

Except for the process for preparing the negative electrode plate of the present application, other configurations and preparation processes of the secondary battery according to the present application are known per se. For example, the positive plate of the present application can be prepared as follows: mixing an positive electrode active material, optional conductive agents (such as carbon materials for example carbon black) and binders (such as PVDF) and the like, dispersing the mixture into a solvent (such as NMP), uniformly stirring, coating the mixture on a positive current collector, and drying to obtain a positive plate. Material such as aluminum foil or porous metal plate can be used as a positive electrode current collector. When the positive plate is manufactured, a positive tab can be obtained in the uncoated area of the positive current collector through modes of punching or laser die cutting and the like.

Finally, the positive electrode plate, the separator and the negative electrode plate can be stacked, the separator between the positive and negative electrode plates works for isolation, and then the electrode assembly can be obtained by a winding or laminating process; the battery assembly is placed in an external package, into which the electrolyte solution is injected when it is dried. After that, the processes of vacuum packing, steady standing, formation, and shaping are carried out, thereby obtaining a secondary battery.

Apparatus

An apparatus is provided in the third aspect of the present application. The apparatus comprises a secondary battery according to the first aspect of the present application or comprises a secondary battery prepared by the process according to the second aspect of the present application. The secondary battery can be used as the power source of the apparatus or as the energy storage unit of the apparatus. The apparatus in the present application uses the secondary battery provided in the present application and thus has at least the same advantage as the secondary battery.

The apparatus can be, but is not limited to, a mobile apparatus (such as mobile phone, laptop, etc.), an electric vehicle (such as a pure electric vehicle, hybrid electric vehicle, plug-in hybrid electric vehicle, electric bicycle, electric scooter, electric golf cart, electric truck, etc.), an electric train, a ship and satellite, an energy storage system, etc.

The apparatus may be a secondary battery, battery module or battery pack according to its application requirement.

Figure 8:
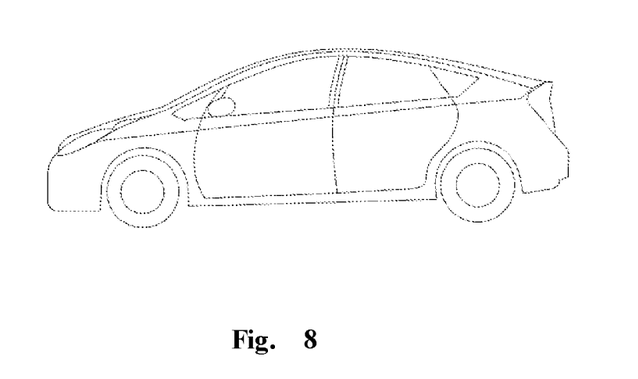
FIG. 8 shows a schematic diagram of an embodiment of an apparatus in the present application that applies the secondary battery as a power source.

FIG. 8 shows an apparatus as an example. The apparatus is may be pure electric vehicle, hybrid electric vehicle, or plug-in electric hybrid electric vehicle and so on. To meet the requirements of the apparatus for the high rate and high energy density of secondary batteries, the battery pack or battery module can be used.

The apparatus, as another example, may be mobile phone, tablet PC, laptop, and the like. The apparatus is usually required to be lightweight and can be powered by the secondary battery.

The beneficial effects of the present application are further described in combination with the examples as follows.

EXAMPLES

To make the invention purpose, technical solution and beneficial technical effects of the present application clearer, the present application is further described in combination with the following examples. However, it should be understood that the examples of the present application is intended only to explain the present application, but not to restrict the present application in any way, and that examples of the present application are not limited to the examples given in the specification. The test conditions or operating conditions not specified in the examples shall be made according to normal conditions or as recommended by the material supplier.

I. Preparation of Secondary Batteries

Example 1

1) Preparation of Positive Electrode Plate

Lithium nickel cobalt manganese ternary active material $LiNi_{0.8}Co_{0.1}Mn_{0.1}O_2$ (NCM 811), a conductive carbon black (Super-P) and a binder polyvinylidene fluoride (PVDF) in a weight ratio of 94:3:3 were mixed in an N-methylpyrrolidone solvent (NMP) and well stirred until homogeneous, thereby giving a slurry. The slurry was applied on an aluminum foil substrate followed by drying, cold pressing, splitting, cutting and the like to give a positive electrode plate. The positive electrode film had an areal density of 17.5 mg/cm² and a compacted density of 3.4 g/cm³.

2) Preparation of Negative Electrode Plate

Step one, preparing negative slurry 1: natural graphite as a first negative electrode active material, SBR as a binder, sodium carboxyl methylcellulose (CMC-Na) as a thickener and a conductive carbon black (Super-P) at a weight ratio of 96.2:1.8:1.2:0.8 together with deionized water were added to a stirring tank in a certain order for mixing to prepare the negative slurry 1;

Step two, preparing negative slurry 2: artificial graphite as a second negative electrode active material, SBR as a binder, sodium carboxyl methylcellulose (CMC-Na) as a thickener, and a conductive carbon black (Super-P) at a ratio of 96.2:1.8:1.2:0.8 together with deionized water were added to a stirring tank in a certain order for mixing to prepare negative slurry 2;

Step three, extruding the negative slurry 1 and negative slurry 2 at the same time through a dual-cavity coating apparatus. The negative slurry 1 was applied on a negative current collector to form a first negative electrode film, and the negative slurry 2 was coated on the first negative electrode film to form a second negative electrode film, wherein the mass ratio of the first negative electrode film to the second negative electrode film was 1:1, and the whole negative electrode film had had an areal density of 11.5 mg/cm² and a compacted density of 1.65 g/cm³; and Step four, baking the applied wet film in an oven at different temperature areas to form a dried plate, which was subjected to cold pressing to form the desired negative electrode film; after that, striping, cutting and the like were performed to give a negative electrode plate.

3) Separator

PE film was selected as separator.

4) Preparation of Electrolyte Solution

Ethylene carbonate (EC), methyl ethyl carbonate (EMC) and diethyl carbonate (DEC) were mixed according to a volume ratio of 1:1:1. Then a fully dried lithium salt $LiPF_6$ was dissolved into the mixed organic solvent at the ratio of 1 mol/L to prepare an electrolyte solution.

5) Preparation of Battery

The positive plate, the separator and the negative electrode plate described as above were sequentially stacked, and the stack was wound into an electrode assembly. The electrode assembly was packed into an outer package into which the electrolyte was added. After packaging, standing, formation, aging and the like, a secondary battery was thus obtained.

The preparation processes of secondary batteries of Examples 2 to 17 and Comparative Examples 1 to 2 were similar to those of Example 1, with the exception that the composition of negative electrode plate and product parameters were adjusted. The different product parameters for different examples are shown in Table 1 and Table 2.

II. Test Methods for Battery Performance

1. Low-Temperature Lithium Precipitation Performance Test

At 25° C., the secondary batteries prepared in the above examples and comparative examples were subjected to a charging and discharging test including constant-current discharging the battery at a current of 1.0C (i.e., the current value at which the theoretical capacity is completely discharged within 1 h) to a cut-off voltage of 2.8V, constant-current charging the battery to a charging cut-off voltage of 4.2 at a current of 1.0C, then constant-voltage charging the battery to a current of 0.05C, at which state the battery is fully charged. After the fully charged battery was allowed to stand for 5 minutes, it was discharged at a constant current of 1.0C to the discharge cut-off voltage. The discharging capacity at this state was the actual capacity of the battery at 1.0C, which was recorded as C0. Then the battery was allowed to stand for 30 minutes in an environment of −10° C., then was charged with a constant current of x C0 to the upper limit of the cut-off voltage, and then was charged with a constant voltage to current of 0.05C0. After standing 5 minutes, the battery was disassembled to observe the interface lithium precipitation. If lithium was not precipitated on the surface of the negative electrode, batteries were subjected the test at an increased charging rate again until lithium was precipitated on the surface of the negative electrode. The maximum charge rate at which no lithium was precipitated on the surface of the negative electrode was recorded to characterize the low-temperature lithium precipitation performance of batteries.

2. High Temperature Cycle Performance Test

At 60° C., the batteries prepared in the above examples and comparative examples were charged and discharged for the first time including constant-current and constant-voltage charging the battery at a charging current of 1.0C (i.e., the current value at which the theoretical capacity is completely discharged within 1 h) to a charging cut-off voltage of 4.2, then constant-voltage discharging the battery at a discharging current of 1.0 C to a discharging cut-off voltage of 2.8V, which is a charging-discharging cycle and at which the discharging capacity is the discharging capacity for the first cycle. Subsequently, continuous charging and discharging cycles were carried, the discharge capacities after each cycle were recorded. According to the capacity retention rate of the $N^{th}$ cycle=(discharge capacity for the $N^{th}$ cycle/discharge capacity for the first cycle)×100%, the capacity retention rate of each cycle were calculated. When the cycle capacity retention rate was equal to 80%, the number of cycles was recorded.

III. Test Results for Each of Examples and Comparative Examples

In accordance with the above methods, the batteries of the examples and comparative examples were prepared, and tested for various performance parameters. The results are shown in Table 1 and Table 2 as below.

First of all, it was shown by the data of Examples 1 to 5 and Comparative Examples 1 to 2 in Table 1 that only when the first negative electrode active material satisfied 0.60≤S1≤0.85, the secondary battery had both better low-temperature rate performance and longer cycle life. When S1 was too small, the cycle performance was poor; and when S1 was too large, the low-temperature rate performance was poor. In particular, when 0.70≤S1≤0.80, the overall performance of the secondary battery was optimal.

In addition, it was shown by Examples 6 to 17 in Table 2 that the volume average particle size DV50 of natural graphite and artificial graphite also had a greater impact on battery performance. On the premise of satisfying 0.60≤S1≤0.85, in order to have better low-temperature rate performance and longer cycle life at the same time, the volume average particle size DV50 of natural graphite was preferably in the range of 15 μm to 19 μm, more preferably from 16 μm to 18 μm; and the volume average particle size DV50 of the artificial graphite was preferably in the range of 14 μm to 18 μm, more preferably from 15 μm to 17 μm.

According to the data in Table 1 and Table 2, it can be seen that in order to obtain secondary batteries with a better low-temperature rate performance and longer cycle life while having a higher energy density, the secondary battery should meet 0.60≤S1≤0.85.

Below are some exemplary embodiments of the present application.

Embodiment 1. A secondary battery comprising a negative electrode plate, wherein the negative electrode plate comprises a negative electrode current collector and a negative electrode film, and the negative electrode film comprises a first negative electrode film and a second negative electrode film;

the first negative electrode film is disposed on at least one surface of the negative electrode current collector and comprises a first negative electrode active material; the second negative electrode film is disposed on the first negative electrode film and comprises a second negative electrode active material, the first negative electrode active material comprises natural graphite and satisfies: 0.60≤S1≤0.85, where $S1=W_{2H}/(W_{3R}+W_{2H})$; and the second negative electrode active material comprises artificial graphite, in which $W_{3R}$ is a peak area of 101 crystal plane in a X-ray diffraction spectrum of the first negative electrode active material at a diffraction angle of 43.3±0.05°, and $W_{2H}$ is a peak area of 101 crystal plane in a X-ray diffraction spectrum of the first negative electrode active material at a diffraction angle of 44.5±0.05°.

Embodiment 2. The secondary battery according to Embodiment 1, wherein 0.70≤S1≤0.80.

Embodiment 3. The secondary battery according to any one of Embodiments 1 to 2, wherein a volume average particle size DV50 of the first negative electrode active material is larger than a volume average particle size DV50 of the second negative electrode active material.

Embodiment 4. The secondary battery according to any one of Embodiments 1 to 3, wherein the volume average particle size DV50 of the first negative electrode active material is from 15 μm to 19 μm, preferably from 16 μm to 18 μm; and/or, the volume average particle size DV50 of the second negative electrode active material is from 14 μm-18 μm, preferably 15 μm-17 μm.

Embodiment 5. The secondary battery according to any one of Embodiments 1 to 4, wherein the first negative electrode active material has a graphitization degree of from 95% to 98%, preferably from 96% to 97%; and/or the second negative electrode active material has a graphitization degree of from 90% to 95%, preferably from 91% to 93%.

Embodiment 6. The secondary battery according to any one of Embodiments 1 to 5, wherein the first negative electrode active material has a powder compaction density of from 1.85 g/cm³ to 2.1 g/cm³, preferably from 1.9 g/cm³ to 2.0 g/cm³ under a pressure of 50,000 N; and/or the second negative electrode active material has a powder compaction density of from 1.7 g/cm³ to 1.9 g/cm³, preferably from 1.8 g/cm³ to 1.9 g/cm³ under a pressure of 50,000 N.

Embodiment 7. The secondary battery according to any one of Embodiments 1 to 6, wherein the first negative electrode active material has a specific surface area (SSA) of from 1.6 m²/g to 2.4 m²/g, preferably from 1.8 m²/g to 2.2 m²/g; and/or the second negative electrode active material has a specific surface area (SSA) of from 0.7 m²/g to 1.5 m²/g, preferably from 0.9 m²/g to 1.3 m²/g.

Embodiment 8. The secondary battery according to any one of Embodiments 1 to 7, wherein the natural graphite has a morphology that is one or more of spherical and quasi-spherical; and/or the artificial graphite has a morphology that is one or more of a block shape and a sheet shape.

Embodiment 9. The secondary battery according to any one of Embodiments 1 to 8, wherein the natural graphite is present in the first negative electrode active material in a mass percentage of ≥50%, more preferably from 80% to 100%; and/or the artificial graphite is present in the second negative electrode active material in a mass ratio of is ≥80%, more preferably 90%-100%.

Embodiment 10. The secondary battery according to any one of Embodiments 1 to 9, wherein a thickness ratio of the first negative electrode film to the second negative electrode film is from 1:1.01 to 1:1.1, preferably from 1:1.02 to 1:1.06.

Embodiment 11. The secondary battery according to any one of Embodiments 1 to 10, wherein the negative electrode film has an areal density of 10 mg/cm² ≤ CW ≤ 13 mg/cm², preferably, 10.5 mg/cm² ≤ CW ≤ 11.5 mg/cm².

Embodiment 12. The secondary battery according to any one of Embodiments 1 to 11, wherein the secondary battery comprises a positive electrode plate, the positive electrode plate comprises a positive electrode current collector and a positive electrode film disposed on at least one surface of the positive electrode current collector and comprising a positive electrode active material, the positive electrode active material comprises one or more of lithium transition metal oxides, lithium phosphates of olivine structure and their respective modified compounds, preferably, the positive electrode active material comprises one or more of a lithium transition metal oxide represented by formula 1 and the modified compounds thereof, $$Li_aNi_bCo_cM_dO_eA_f$$ Formula 1, in which, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S, and Cl.

Embodiment 13. A process for preparing a secondary battery, comprising preparing a negative electrode plate of the secondary battery by the following steps:
1) forming, on at least one surface of a negative electrode current collector, a first negative electrode film comprising a first negative electrode active material that comprises natural graphite and satisfies: $0.60 \leq S1 \leq 0.85$, where $S1 = W_{2H}/(W_{3R} + W_{2H})$; and
2) forming, on the first negative electrode film, a second negative electrode film comprising a second negative electrode active material, that comprises artificial graphite, wherein $W_{3R}$ is a peak area of 101 crystal plane in a X-ray diffraction spectrum of the first negative electrode active material at a diffraction angle of 43.3±0.05°, and $W_{2H}$ is a peak area of 101 crystal plane in a X-ray diffraction spectrum of the first negative electrode active material at a diffraction angle of 44.5±0.05°.

Embodiment 14. An apparatus, comprising the secondary battery according to any one of Embodiments 1-12 or the secondary battery manufactured by the process according to Embodiment 13.

It should also be supplemented that according to the disclosure and guidance of the above-mentioned specifications, those skilled in the art may also make appropriate changes and modifications to the above-mentioned examples. Therefore, the present application is not limited to the specific examples disclosed and described above, and some modifications and changes to the present application fall within the scope of protection of the claims of the present application. In addition, although a number of specific terms are used in this specification, these terms are intended for convenience only and do not constitute any restriction on the present application.

TABLE 1

| No. | Type of the first negative electrode active material | S1 of the first negative electrode active material | Type of the second negative electrode active material | Low-temperature lithium precipitation performance at −10° C. | High-temperature cycle number at capacity retention of 80% |
|---|---|---|---|---|---|
| Ex. 1 | Natural graphite | 0.62 | Artificial graphite | 0.67 C. | 991 |
| Ex. 2 | Natural graphite | 0.67 | Artificial graphite | 0.63 C. | 1133 |
| Ex. 3 | Natural graphite | 0.74 | Artificial graphite | 0.60 C. | 1326 |
| Ex. 4 | Natural graphite | 0.79 | Artificial graphite | 0.55 C. | 1378 |
| Ex. 5 | Natural graphite | 0.84 | Artificial graphite | 0.46 C. | 1415 |
| CEx. 1 | Natural graphite | 0.55 | Artificial graphite | 0.42 C. | 602 |
| CEx. 2 | Natural graphite | 0.95 | Artificial graphite | 0.21 C. | 990 |

TABLE 2

| No. | Type of the first negative electrode active material | S1 of the first negative electrode active material | Dv50 of the first negative electrode active material μm | Type of the second negative electrode active material | Dv50 of the second negative electrode active material μm | Low-temperature lithium precipitation performance at −10° C. | High-temperature cycle number at capacity retention of 80% |
|---|---|---|---|---|---|---|---|
| Ex. 6 | Natural graphite | 0.74 | 15.1 | Artificial graphite | 16.1 | 0.70 C. | 1208 |
| Ex. 7 | Natural graphite | | 16.4 | Artificial graphite | 16.1 | 0.68 C. | 1235 |
| Ex. 8 | Natural graphite | | 17.6 | Artificial graphite | 16.1 | 0.65 C. | 1349 |
| Ex. 9 | Natural graphite | | 18.7 | Artificial graphite | 16.1 | 0.60 C. | 1367 |
| Ex. 10 | Natural graphite | | 17.5 | Artificial graphite | 14.3 | 0.67 C. | 1198 |
| Ex. 11 | Natural graphite | | 17.5 | Artificial graphite | 15.8 | 0.63 C. | 1237 |
| Ex. 12 | Natural graphite | | 17.5 | Artificial graphite | 16.9 | 0.60 C. | 1376 |
| Ex. 13 | Natural graphite | | 17.5 | Artificial graphite | 18.0 | 0.55 C. | 1398 |
| Ex. 14 | Natural graphite | | 12.1 | Artificial graphite | 16.1 | 0.57 C. | 1002 |
| Ex. 15 | Natural graphite | | 23.0 | Artificial graphite | 16.1 | 0.46 C. | 1187 |
| Ex. 16 | Natural graphite | | 17.5 | Artificial graphite | 10.2 | 0.65 C. | 1099 |
| Ex. 17 | Natural graphite | | 17.5 | Artificial graphite | 21.5 | 0.42 C. | 1282 |

What is claimed is:

1. A secondary battery comprising a negative electrode plate, wherein the negative electrode plate comprises a negative electrode current collector and a negative electrode film, and the negative electrode film comprises a first negative electrode film and a second negative electrode film;

the first negative electrode film is disposed on at least one surface of the negative electrode current collector and comprises a first negative electrode active material;

the second negative electrode film is disposed on the first negative electrode film and comprises a second negative electrode active material, the first negative electrode active material comprises natural graphite and satisfies: $0.60 \leq S1 \leq 0.74$, where $S1=W_{2H}/(W_{3R}+W_{2H})$;

the second negative electrode active material comprises artificial graphite, the first negative electrode film is thicker than the second negative electrode film, and a thickness ratio of the first negative electrode film to the second negative electrode film is from 1:1.01 to 1:1.1, in which $W_{3R}$ is a peak area of 101 crystal plane in a X-ray diffraction spectrum of the first negative electrode active material at a diffraction angle of 43.3±0.05°, and $W_{2H}$ is a peak area of 101 crystal plane in a X-ray diffraction spectrum of the first negative electrode active material at a diffraction angle of 44.5±0.05°.

2. The secondary battery according to claim 1, wherein a volume average particle size DV50 of the first negative electrode active material is larger than a volume average particle size DV50 of the second negative electrode active material.

3. The secondary battery according to claim 2, wherein the volume average particle size DV50 of the first negative electrode active material is from 15 μm to 19 μm; and/or, the volume average particle size DV50 of the second negative electrode active material is from 14 μm-18 μm.

4. The secondary battery according to claim 1, wherein the first negative electrode active material has a graphitization degree of from 95% to 98%; and/or the second negative electrode active material has a graphitization degree of from 90% to 95%.

5. The secondary battery according to claim 1, wherein the first negative electrode active material has a powder compaction density of from 1.85 g/cm³ to 2.1 g/cm³ under a pressure of 50,000 N; and/or the second negative electrode active material has a powder compaction density of from 1.7 g/cm³ to 1.9 g/cm³ under a pressure of 50,000 N.

6. The secondary battery according to claim 1, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

7. The secondary battery according to claim 1, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

8. The secondary battery according to claim 2, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

9. The secondary battery according to claim 3, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

10. The secondary battery according to claim 4, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

11. The secondary battery according to claim 5, wherein the first negative electrode active material has a specific surface area (SSA) of from 1.6 m²/g to 2.4 m²/g; and/or the second negative electrode active material has a specific surface area (SSA) of from 0.7 m²/g to 1.5 m²/g.

12. The secondary battery according to claim 1, wherein the natural graphite has a morphology that is one or more of spherical and quasi-spherical; and/or the artificial graphite has a morphology that is one or more of a block shape and a sheet shape.

13. The secondary battery according to claim 1, wherein the natural graphite is present in the first negative electrode active material in a mass percentage of ≥50%; and/or the artificial graphite is present in the second negative electrode active material in a mass ratio of is ≥80%.

14. The secondary battery according to claim 1, wherein the negative electrode film has an areal density of 10 mg/cm² ≤ CW ≤ 13 mg/cm².

15. The secondary battery according to claim 1, wherein the secondary battery comprises a positive electrode plate, the positive electrode plate comprises a positive electrode current collector and a positive electrode film disposed on at least one surface of the positive electrode current collector and comprising a positive electrode active material, the positive electrode active material comprises one or more of lithium transition metal oxides, lithium phosphates of olivine structure and their respective modified compounds.

16. A process for preparing a secondary battery, comprising preparing a negative electrode plate of the secondary battery by the following steps:

1) forming, on at least one surface of a negative electrode current collector, a first negative electrode film comprising a first negative electrode active material that comprises natural graphite and satisfies: $0.60 \leq S1 \leq 0.74$, where $S1=W_{2H}/(W_{3R}+W_{2H})$; and 2) forming, on the first negative electrode film, a second negative electrode film comprising a second negative electrode active material, that comprises artificial graphite, wherein the first negative electrode film is thicker than the second negative electrode film, wherein a thickness ratio of the first negative electrode film to the second negative electrode film is from 1:1.01 to 1:1.1, and wherein $W_{3R}$ is a peak area of 101 crystal plane in a X-ray diffraction spectrum of the first negative electrode active material at a diffraction angle of 43.3±0.05°, and $W_{2H}$ is a peak area of 101 crystal plane in a X-ray diffraction spectrum of the first negative electrode active material at a diffraction angle of 44.5±0.05°.

17. An apparatus, comprising the secondary battery according to claim 1.

* * * * *